No. 612,867. Patented Oct. 25, 1898.
L. PETERSON.
SEED BOX FOR PLANTERS.
(Application filed June 24, 1898.)
(No Model.)
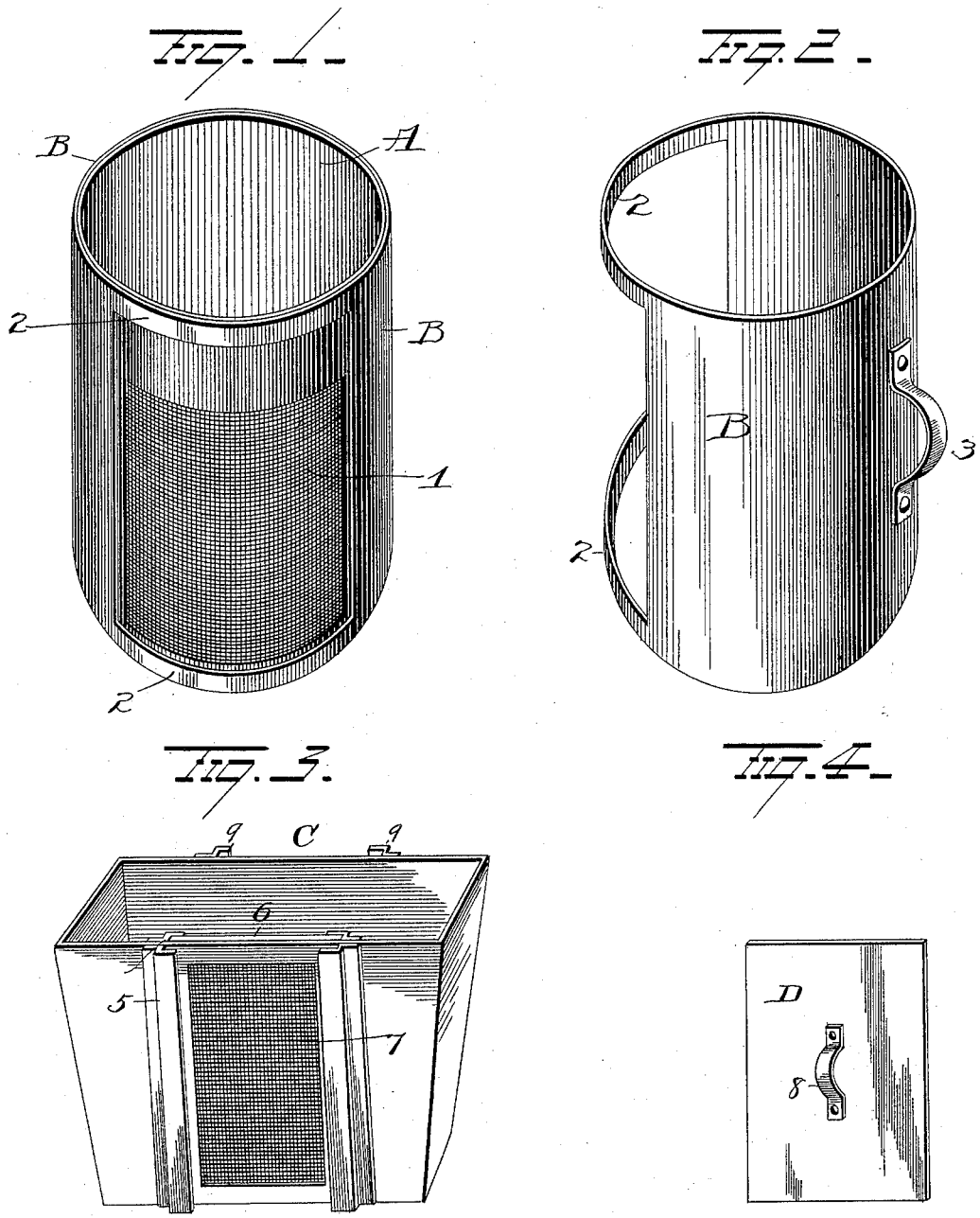
WITNESSES
E. J. Nottingham
G. F. Downing
INVENTOR
L. Peterson
By H. A. Seymour
Attorney

UNITED STATES PATENT OFFICE.

LEWIS PETERSON, OF MADRID, IOWA.

SEEDBOX FOR PLANTERS.

SPECIFICATION forming part of Letters Patent No. 612,867, dated October 25, 1898.

Application filed June 24, 1898. Serial No. 684,354. (No model.)

*To all whom it may concern:*

Be it known that I, LEWIS PETERSON, a resident of Madrid, in the county of Boone and State of Iowa, have invented certain new and useful Improvements in Seedboxes for Planters; and I do hereby declare the following to be a full, clear, and exact description of the invention, such as will enable others skilled in the art to which it appertains to make and use the same.

My invention relates to an improvement in seedboxes for planters, the object of the invention being to provide a box which shall be simple in construction, extremely cheap to manufacture, and one that will permit the operator to see at a glance the amount of seed in said box.

A further object is to provide a box that will permit the dirt to fall out of said box, but will securely hold the seed therein.

With these objects in view the invention consists in certain novel features of construction and combinations and arrangements of parts, as will be more fully hereinafter described, and pointed out in the claims.

In the accompanying drawings, Figure 1 is a view illustrating my improvements. Fig. 2 is a detail view of the shutter B, and Figs. 3 and 4 are views of a modified form of my invention.

A represents a seedbox preferably cylindrical in form and provided in its side with an opening or slot of any desired size, over which a screen 1 of wire-netting is secured, said netting being of fine enough mesh to prevent the grain or seed from passing therethrough. Instead of a screen of wire mesh, as shown, I might employ a perforated plate, and hence I do not wish to be limited to any particular form of screen.

A revoluble shutter B, preferably semicircular in horizontal section, is adapted to cover the opening 1 and is provided with straps or guides 2 2, disposed at the top and bottom, respectively, of said shutter and adapted, together with said shutter, to encircle the said box and to be turned thereon by means of a handle 3, as shown. The shutter B is normally turned so as to expose the screen 1 and permit the operator to tell at a glance the amount of grain or seed contained in the box; but should it be desired for any reason—as, for instance, should it rain—to cover the screen the shutter can be turned and prevent any water or dampness reaching the grain or seed.

Instead of the form of my invention above described I might employ such a construction as shown in Figs. 3 and 4, in which form I employ an angular box C, provided with an opening or cut-out portion in one side, as shown. Flanges 5 are secured to the sides of said box adjacent to said opening. Between one flange and the side of the box a frame 6, containing a screen 7, may be slid in place to effectually close said opening. A sliding shutter D, provided with a handle 8, as shown, may also be slid between the other flange and the side of the box to effectually close said opening, if desired, either while the screen is in place or after same has been removed. Flanges 9 may be provided in one side of the box to receive the shutter when same is not covering the screen.

Various slight changes might be made in the general form and arrangement of the several parts described without departing from the spirit and scope of my invention, and hence I would have it understood that I do not care to limit myself to the precise details set forth, but consider myself at liberty to make such changes and alterations as fairly fall within the spirit and scope of my invention.

Having fully described my invention, what I claim as new, and desire to secure by Letters Patent, is—

1. A seedbox for a planting-machine provided with an opening in its wall and a screen covering said opening, whereby to permit the discharge of dirt from the box and to permit the contents of the box to be observed, substantially as set forth.

2. The combination with a seedbox for a planter, having an opening in its wall, of a screen covering said opening to permit the discharge of dirt from the box and the observation of the condition of the contents of said box and a movable cover for closing said opening to exclude moisture, substantially as set forth.

3. The combination with a seedbox of a planter having an opening in its wall, of a screen covering said opening to permit the escape of dirt and the observation of the condition of the contents of the box and a shutter adjustably mounted on the box for closing said opening.

4. The combination with a seedbox for a planter, having an opening in its wall, of a revoluble shutter embracing the box for closing said opening, said shutter having an opening to aline with the opening in the box and a screen covering the opening in the box, substantially as set forth.

In testimony whereof I have signed this specification in the presence of two subscribing witnesses.

LEWIS PETERSON.

Witnesses:
LEONARD JOHNSON,
ALBERT GERLING.